United States Patent
Yeom et al.

(10) Patent No.: US 12,005,913 B2
(45) Date of Patent: Jun. 11, 2024

(54) METHOD OF DIRECTLY CONTROLLING AUTONOMOUS VEHICLE

(71) Applicants: Hyundai Motor Company, Seoul (KR); Kia Corporation, Seoul (KR)

(72) Inventors: Myung-Ki Yeom, Incheon (KR); In-Su Kim, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 558 days.

(21) Appl. No.: 17/396,489

(22) Filed: Aug. 6, 2021

(65) Prior Publication Data

US 2022/0185306 A1 Jun. 16, 2022

(30) Foreign Application Priority Data

Dec. 14, 2020 (KR) .................. 10-2020-0174253

(51) Int. Cl.
*B60W 50/10* (2012.01)
*B60K 35/00* (2024.01)
(Continued)

(52) U.S. Cl.
CPC ............. *B60W 50/10* (2013.01); *B60K 35/00* (2013.01); *B60W 50/14* (2013.01);
(Continued)

(58) Field of Classification Search
CPC .. B60W 50/10; B60W 50/14; B60W 60/0053; B60W 2050/146; B60W 2540/12; B60W 2540/215; B60W 2540/227; B60W 2720/10; B60W 2720/12; B60W 60/0054; B60W 2540/045; B60W 10/18;
(Continued)

(56) References Cited

U.S. PATENT DOCUMENTS

2020/0017122 A1* 1/2020 Chatten ................ G01C 21/365

FOREIGN PATENT DOCUMENTS

KR 10-2018-0126707 A 11/2018

OTHER PUBLICATIONS

URL: https://www.youtube.com/watch?v=d3YT8j0yY10—English description obtained Jul. 26, 2021.
(Continued)

*Primary Examiner* — Michael D Lang
*Assistant Examiner* — Andrew Sang Kim
(74) *Attorney, Agent, or Firm* — MORGAN, LEWIS & BOCKIUS LLP

(57) ABSTRACT

A method of controlling vehicle driving, when a plurality of occupants is in the vehicle, by implementing components required for vehicle driving control as holographic images to ensure a maximum space in an autonomous vehicle, may include steps of requesting, by a first occupant currently having no driving control authority, a transfer of the authority by use of a holographic image, accepting, by a second occupant currently having the driving control authority, the transfer of the authority by use of the holographic image, selecting, by the first occupant, a mode by use of the holographic image based on the acceptance by the second occupant, and performing vehicle control in accordance with the mode selected by the first occupant, and the holographic images in the respective steps are displayed to the occupants wearing an HMD device.

18 Claims, 10 Drawing Sheets

(51) Int. Cl.
| | |
|---|---|
| *B60K 35/10* | (2024.01) |
| *B60K 35/20* | (2024.01) |
| *B60K 35/28* | (2024.01) |
| *B60W 50/14* | (2020.01) |
| *B60W 60/00* | (2020.01) |

(52) U.S. Cl.
CPC ......... *B60W 60/0053* (2020.02); *B60K 35/10* (2024.01); *B60K 35/20* (2024.01); *B60K 35/28* (2024.01); *B60K 2360/146* (2024.01); *B60K 2360/151* (2024.01); *B60K 2360/175* (2024.01); *B60K 2360/178* (2024.01); *B60K 2360/29* (2024.01); *B60W 2050/146* (2013.01); *B60W 2540/12* (2013.01); *B60W 2540/215* (2020.02); *B60W 2540/227* (2020.02); *B60W 2720/10* (2013.01); *B60W 2720/12* (2013.01)

(58) Field of Classification Search
CPC .... B60W 40/08; B60W 40/105; B60W 50/08; B60W 2050/143; B60K 35/00; B60K 2370/146; B60K 2370/151; B60K 2370/175; B60K 2370/178; B60K 2370/29; B60K 2370/152; B60R 22/48; G03H 1/0005; G03H 1/04; G03H 1/22; G05D 1/0061; G05D 2201/213; G06F 3/017
See application file for complete search history.

(56) References Cited

OTHER PUBLICATIONS

URL: https://www.youtube.com/watch?v=uIHPPtPBgHk—English description obtained Jul. 26, 2021.

* cited by examiner

STATIONARY MODE

FOLLOW-ME MODE

METHOD OF DIRECTLY CONTROLLING AUTONOMOUS VEHICLE

CROSS-REFERENCE TO RELATED APPLICATIONS

The present application claims priority to Korean Patent Application No. 10-2020-0174253, filed on Dec. 14, 2020, in the Korean Intellectual Property Office, the entire contents of which is incorporated herein for all purposes by this reference.

BACKGROUND OF THE INVENTION

Field of the Invention

The present invention relates to a method of directly controlling an autonomous vehicle, and more particularly, to a method of facilitating an authorized occupant to control a vehicle by use of and manipulating holograms implemented in a three-dimensional manner in the vehicle.

Description of Related Art

An autonomous vehicle refers to a vehicle that determines a risk by recognizing a traveling environment, minimizes a driver's driving operation by planning a traveling route, and autonomously travels safely without being directly manipulated by the driver.

Meanwhile, the operations of the autonomous vehicle, such as steering, acceleration and braking, may be controlled in a manual driving mode or an autonomous driving mode. In the instant case, in the autonomous driving mode, a steering wheel, an accelerator pedal, and a brake pedal need to be hidden to ensure a maximum space inside the vehicle to allow an occupant in the vehicle to perform personal tasks or take a rest, and the steering wheel, the accelerator pedal, and the brake pedal need to appear to a driver or occupant in the event of emergency or in the manual driving mode. To implement the present technology, it is possible to implement, in a hologram, components such as the steering wheel, the accelerator pedal, and the brake pedal required to perform vehicle driving control.

An occupant wearing HoloLens may see a holographic image projected in the internal space of the vehicle in a three-dimensional manner, and the steering wheel, the accelerator pedal, and the brake pedal are implemented as the holographic images. HoloLens is a head mounted display (HMD), that is, a mixed reality-based wearable device. A virtual reality (VR) device such as Oculus Rift or HTC Vive implements virtual reality (VR) through a separate display that completely blocks a visual field, but HoloLens is different from the virtual reality (VR) device in that the user wearing HoloLens may see the user's surrounding environment through a semi-transparent display. That is, unlike virtual reality (VR), which shows a complete virtual screen, or augmented reality (AR) which overlays an actual screen, HoloLens using a window holographic technology means mixed reality (MR) which may output and freely manipulate a scanned 3D image of a real object on a real screen.

HoloLens is dedicated for Microsoft's "Windows 10". Windows 10 also has an API embedded therein for developing HoloLens applications (apps). That is, the apps developed for HoloLens may be used for various devices that operate in Windows 10. A gesture manipulation technology that manipulates AR images with hand gestures is applied, and a voice recognition function is also provided to recognize the user's voice command. Some of the technical details of Microsoft's HoloLens are included through the following URL address.

https://www.youtube.com/watch?v=d3YT8j0yY10
https://www.youtube.com/watch?v=uIHPPtPBgHk Meanwhile, Korean Patent Application Laid-Open No. 10-2018-0126707 (Hologram Display Control Device, and Hologram Display Control Method, and Vehicle System) includes a technology in the related art that controls vehicle driving by displaying a hologram in a vehicle. Korean Patent Application Laid-Open No. 10-2018-0126707 includes a technology for performing steering control by manipulating a holographic image of a steering wheel, that is, a technology for projecting a first holographic image, which corresponds to an image of a manipulation unit of the steering wheel, onto a predefined first region and transmitting a control signal to a drive unit of the vehicle by recognizing the operation of manipulating a button in the first holographic image.

However, Korean Patent Application Laid-Open No. 10-2018-0126707 is a technology that cannot be applied to a vehicle, among autonomous vehicles, in which components required for vehicle driving control are hidden to ensure a space in the vehicle, and the present technology cannot solve a problem that occurs in such a vehicle regarding a transfer of driving control authority between a plurality of occupants.

DOCUMENT OF RELATED ART

Patent Document

Korean Patent Application Laid-Open No. 10-2018-0126707 (Hologram Display Control Device, Hologram Display Control Method, and Vehicle System)

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a new type of invention configured for removing components required for vehicle driving control to ensure a space in an autonomous vehicle and facilitating an occupant, which wears an HMD device among occupants, to perform vehicle driving control using a projected holographic image.

Various aspects of the present invention are directed to providing a method of directly controlling an autonomous vehicle, the method including steps of: requesting, by a first occupant currently having no driving control authority for an autonomous vehicle, a transfer of the driving control authority by selecting an image (A) for requesting the transfer of the driving control authority in a holographic image implemented and displayed in a three-dimensional manner in the vehicle; accepting, by a second occupant currently having the driving control authority, the request of the first occupant by selecting an image (B) for accepting the transfer of the driving control authority, in the holographic image, when the second occupant receives the request for the transfer of the driving control authority from the first occupant; determining a vehicle control mode by selecting, by the first occupant, an image (C) displaying a manual driving mode or an autonomous driving mode, in the holographic image, based on the acceptance by the second occupant; and performing, in accordance with the mode selected by the first occupant, vehicle control of the autonomous vehicle by displaying an image (D), required for vehicle driving control, in the holographic image, and changing the image (D) in a predetermined pattern in accordance with a gesture of the first occupant.

According to various exemplary embodiments of the present invention, the components required for vehicle driving control are implemented as the holographic images, and as a result, it is possible to enable the occupant to maximally utilize the internal compartment of the vehicle when performing personal tasks or taking a rest.

According to various exemplary embodiments of the present invention, it is possible to immediately brake the vehicle and adjust the driving speed to rapidly reduce the driving speed of the vehicle in an emergency situation during the autonomous driving.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
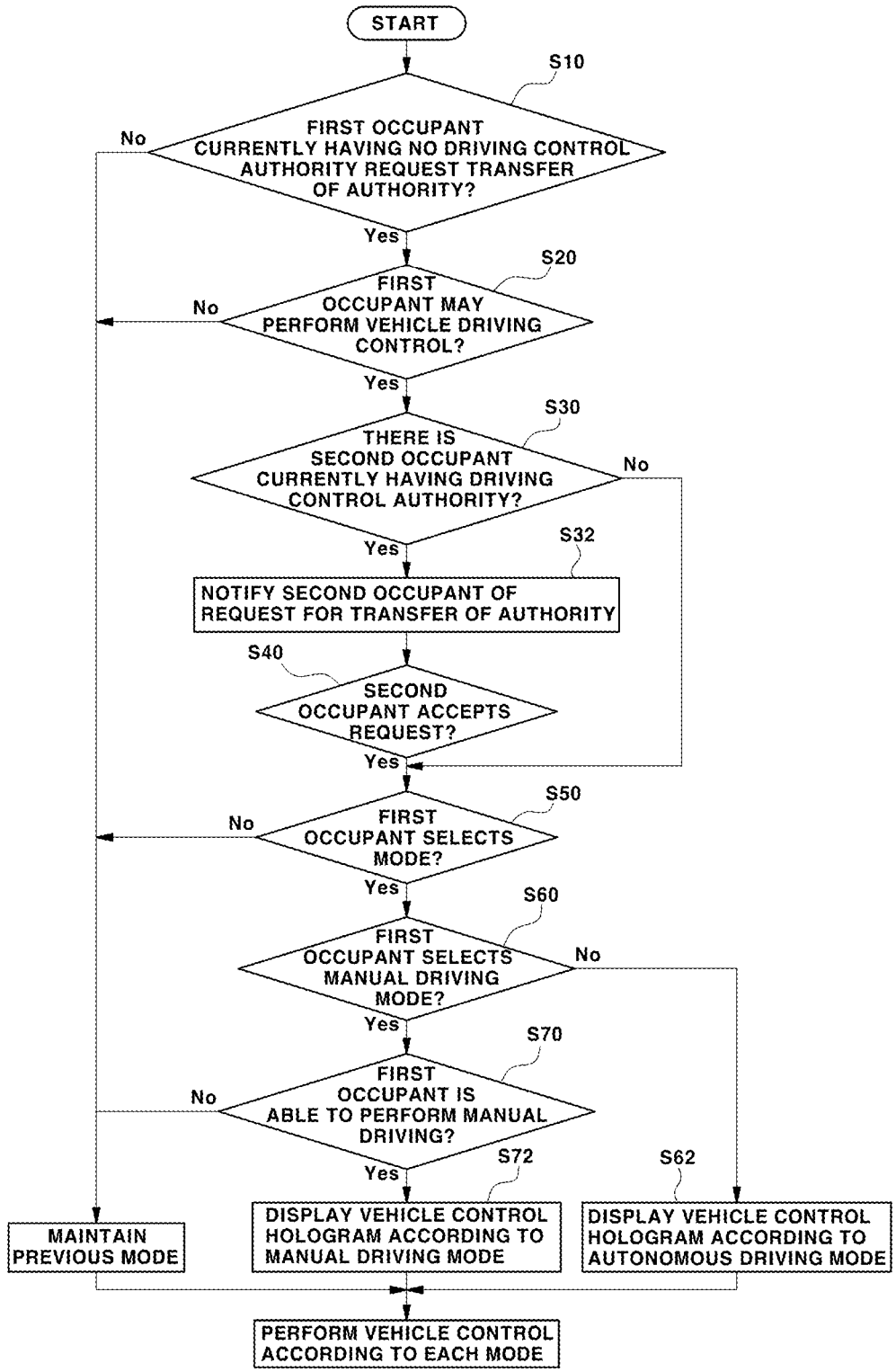
FIG. 1 is a flowchart schematically illustrating a method of directly controlling an autonomous vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of a method of directly controlling an autonomous vehicle according to various exemplary embodiments of the present invention will be described in detail with reference to the drawings. Terms or words used herein may not be interpreted as being limited to general or dictionary meanings and may be interpreted as meanings and concepts which conform to the technical spirit of the present invention based on a principle that an inventor can appropriately define a concept of a term to describe his or her own invention by the best method.

A configuration according to the exemplary embodiment of the present invention includes a system and a hologram device that are required for vehicle driving control. The vehicle driving control system means various types of components, such as an autonomous driving control unit, a steering system, a braking system, and an acceleration system, and a system configured for controlling these components.

Even though a driver does not control a brake pedal, a steering wheel, and an accelerator pedal, the autonomous driving control unit controls the respective systems required for the vehicle driving control by autonomously determining a target traveling route by recognizing a surrounding environment with functions of detecting, analyzing, and processing information inside and outside the vehicle while the vehicle travels. The autonomous driving control unit may have an autonomous driving mode and a manual driving mode.

According to the exemplary embodiment of the present invention, the vehicle is not mounted with physical components such as the steering wheel, the accelerator pedal, and the brake pedal required for the vehicle driving control. Therefore, a sufficient space is ensured in the vehicle to enable the occupant to perform personal tasks or take a rest. The components required for the vehicle driving control may be implemented as holographic images, and the occupant may perform the vehicle driving control using the holographic image projected in the vehicle.

In the exemplary embodiment of the present invention, a hologram device is used to implement the holographic image. The hologram device implements the components required for the vehicle driving control as the holographic images which are virtual objects. The hologram device may control the respective systems in conjunction with the autonomous driving control unit or the systems, such as the steering system, the acceleration system, and braking system, which are real objects and required for the vehicle driving control.

The hologram device according to the exemplary embodiment of the present invention includes a head mounted display (HMD) device. The HMD device is a kind of display device worn on the head. A display attached to the HMD device may be implemented as a transparent display. For example, as the HMD device, there is HoloLens manufactured by Microsoft. The hologram device is not limited to the HMD device, but in the exemplary embodiment, the HMD device, which may be worn on the occupant's head, will be referred to as an example.

When the hologram device operates, the holographic image is displayed on a display. The holographic image may include various user interface (UI) screens related to the vehicle driving control. That is, in the exemplary embodiment, the holographic images may have various shapes such as texts or graphic images. The holographic image includes a region for recognizing a gesture of the occupant wearing HoloLens. When the occupant makes a gesture in the recognition region in the holographic image, the hologram device recognizes the occupant's gesture and applies control signals to the respective systems required for the vehicle driving control based on a change in position of the gesture.

The components of the control device, which are required for the gesture recognition or the vehicle driving control through the hologram, may be implemented by the technology publicly known before the filing date of the present application. For example, regarding the technology for recognizing the gesture through the hologram and the technology for applying control signals to the respective systems required for the vehicle driving control, the reference may be made to the technical description of HoloLens included by Microsoft or the technical description of Korean Patent No. 10-1542986 (System for Recognizing Gesture using Hologram and Method of Controlling Same).

Hereinafter, the method of directly controlling an autonomous vehicle according to the exemplary embodiment of the present invention will be described on the premise that the gesture-based recognition technology using the hologram is applied to the autonomous vehicle and the occupant wearing the HMD device may perform the vehicle driving control using the holographic image.

FIG. 1 is a flowchart schematically illustrating a method of directly controlling an autonomous vehicle according to various exemplary embodiments of the present invention.

The autonomous vehicle may be driven in the autonomous driving mode or the manual driving mode. In the exemplary embodiment, the driving includes acceleration, deceleration, braking, steering, and the like. In the autonomous driving mode, the vehicle travels autonomously. If an emergency situation occurs while the vehicle travels, an occupant needs to rapidly steer or brake the vehicle, and an occupant, who currently has driving control authority among the occupants, performs the steering or braking operation. In the manual driving mode, the occupant, who currently has the driving control authority, manipulates the holographic image required for the vehicle driving control to perform the vehicle driving control.

Meanwhile, the present invention is directed to providing how to perform the vehicle driving control when a plurality of occupants is in the autonomous vehicle and an occupant, who has no driving control authority among the occupants, requests a transfer of the authority. In the exemplary embodiment, a situation in which first and second occupants wearing the HMD devices are in the vehicle will be described.

Meanwhile, as described above, the holographic image related to the vehicle driving control is displayed to the occupant wearing the HMD device. An initial screen in the holographic image may be an image M (see FIG. 2A) that represents a main menu. In the main menu image M, images related to information related to driving control authority, steering, braking, vehicle states, driving modes, fueling, and the like are displayed in selectable forms (e.g., a button shape). When each of the buttons is selected (or touched), the screen may be switched to a related interface screen.

Referring to FIG. 1, whether the first occupant, who currently has no driving control authority, requests the transfer of the driving control authority is determined (S10). When the first occupant selects the button related to the driving control authority in the main menu image M, the screen is switched to a screen on which the first occupant may select whether to request the transfer of the driving control authority. The first occupant may request the transfer of the driving control authority by selecting the button for requesting the transfer of the authority.

FIG. 2A, FIG. 2B, FIG. 2C, and FIG. 2D are views exemplarily illustrating a process of manipulating an image in which a transfer of driving control authority is requested in a holographic image according to the exemplary embodiment of the present invention.

Figure 2A:
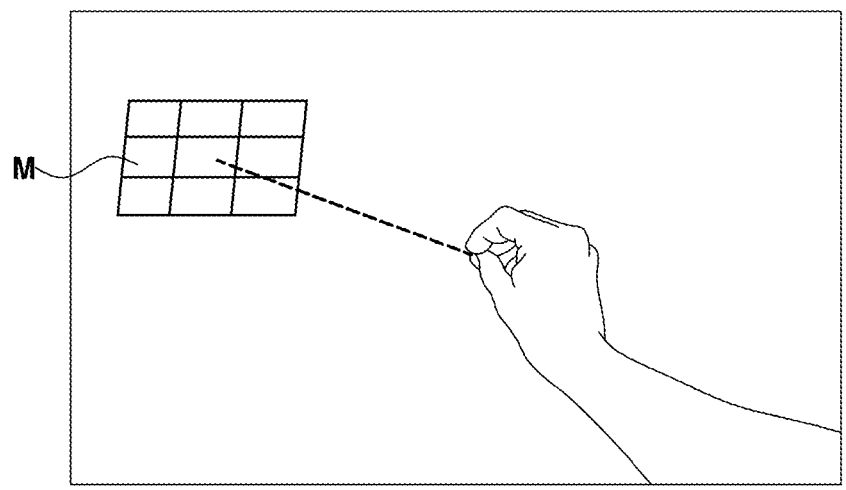
FIG. 2A, FIG. 2B, FIG. 2C, and FIG. 2D are views exemplarily illustrating a process of manipulating an image in which a transfer of driving control authority is requested in a holographic image according to the exemplary embodiment of the present invention.
Figure 2B:
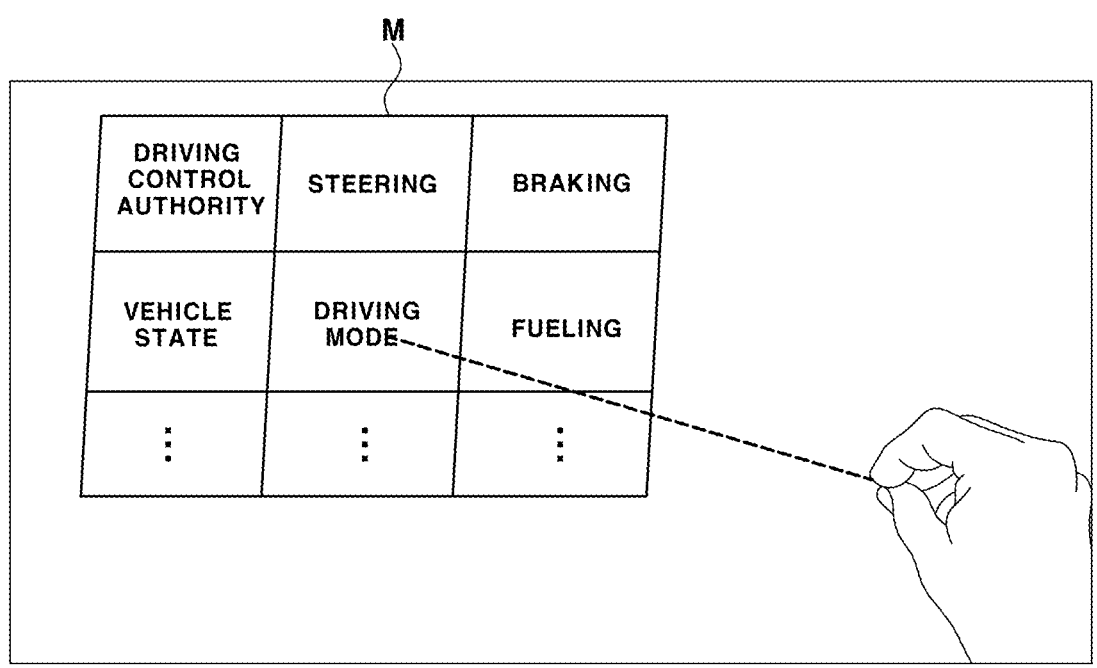
Figure 2C:
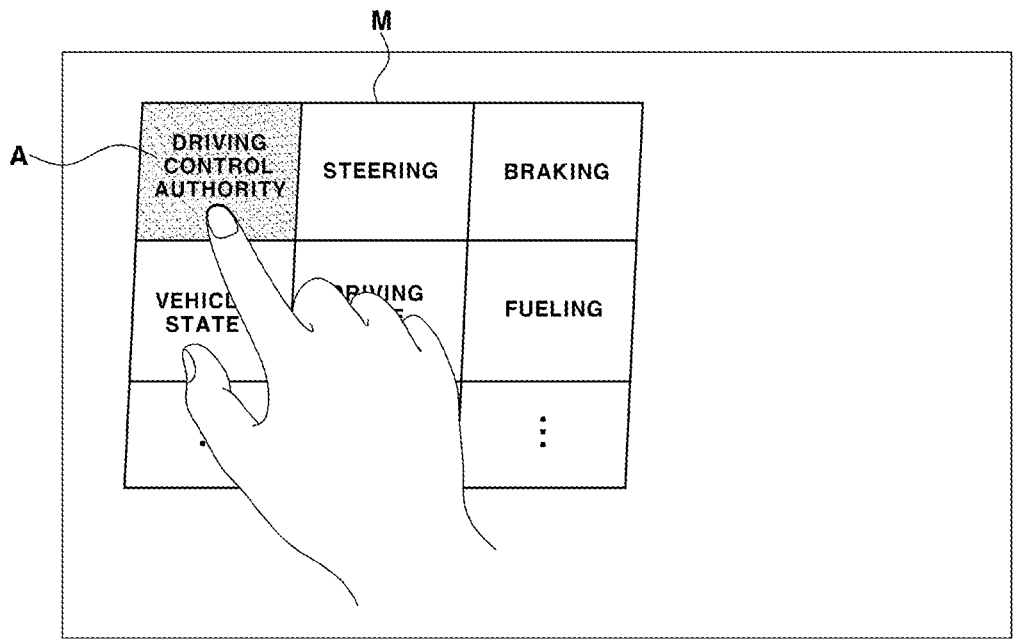
Figure 2D:
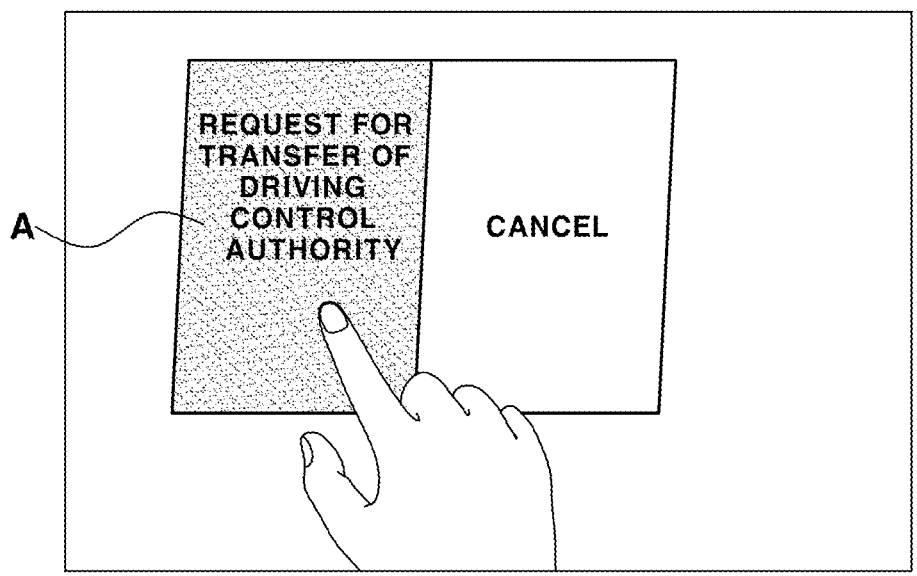
Figure 3A:
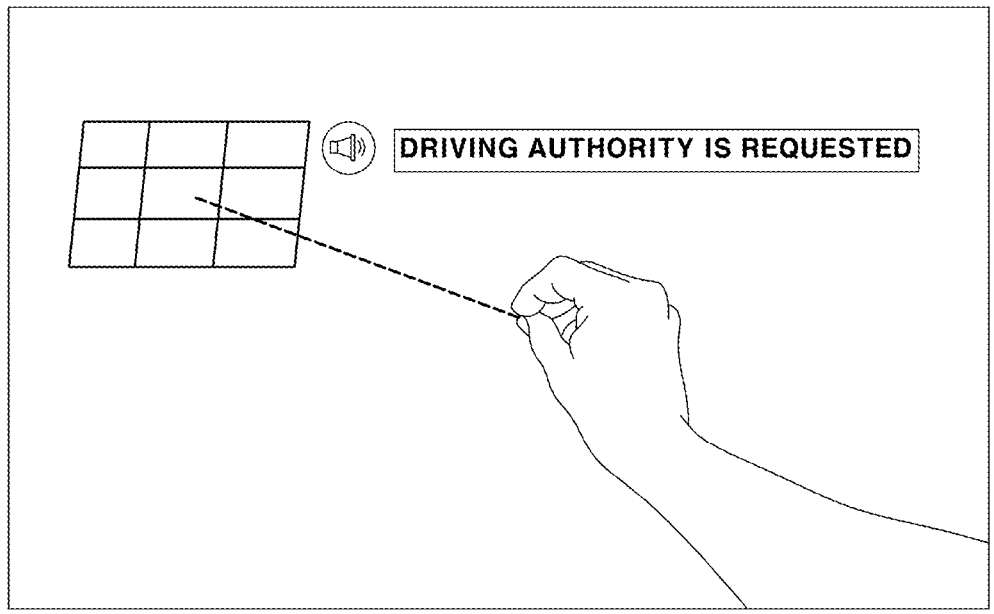
FIG. 3A, FIG. 3B, FIG. 3C, and FIG. 3D are views exemplarily illustrating a process of manipulating an image to accept the transfer of the driving control authority in the holographic image according to the exemplary embodiment of the present invention.
Figure 3B:
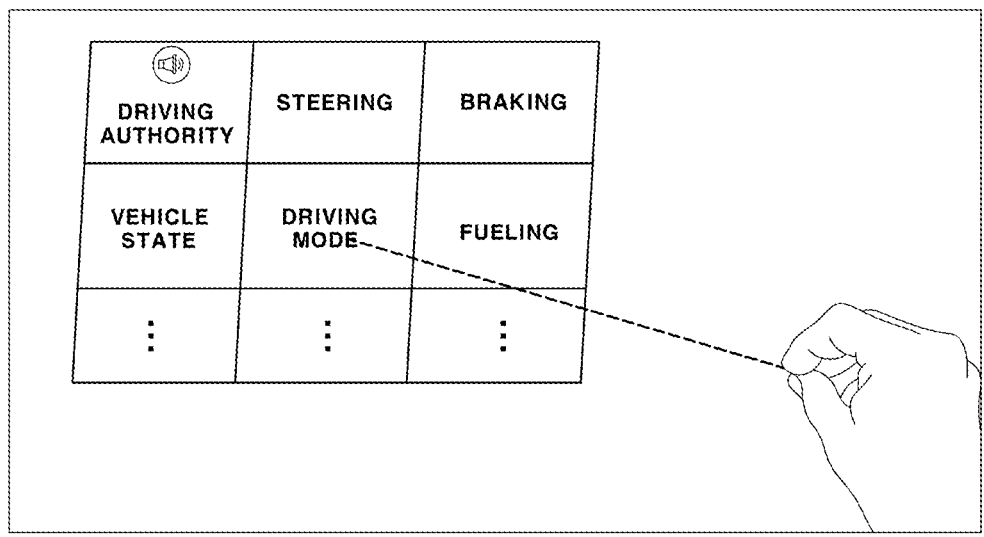
Figure 3C:
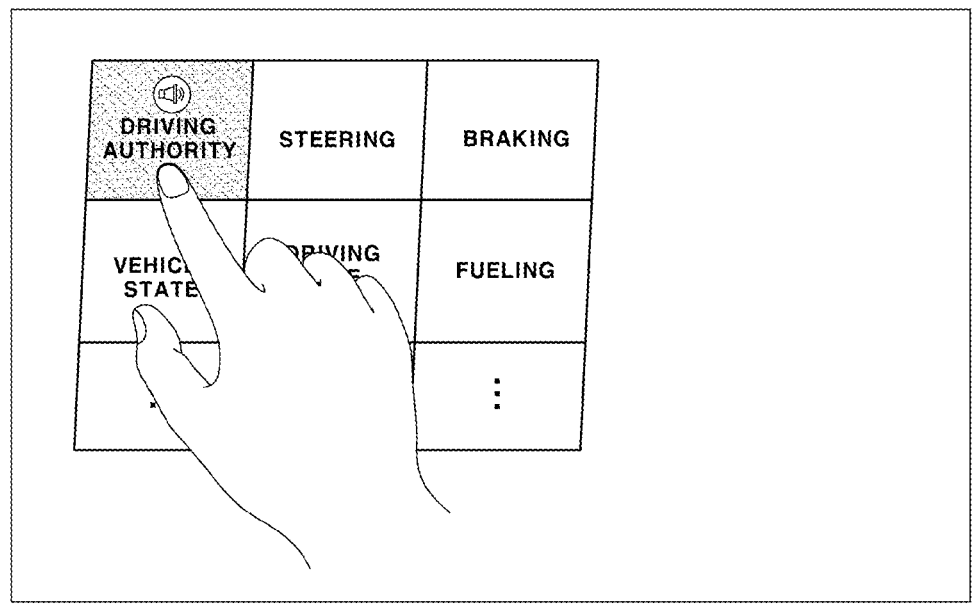
Figure 3D:
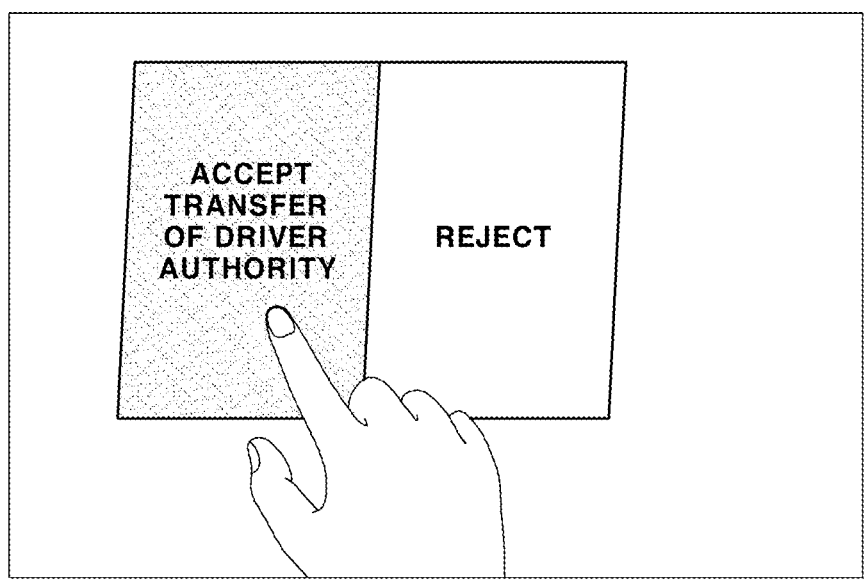

Referring to FIG. 2A, FIG. 2B, FIG. 2C, and FIG. 2D, the first occupant may manipulate the holographic menu image M to request the transfer of the driving control authority. However, when the holographic menu image M is too close to the first occupant, it is difficult for the first occupant to select the menu or there is a likelihood that the first occupant may erroneously select an incorrect menu button. Therefore, as illustrated in FIG. 2A, in the exemplary embodiment of the present invention, the holographic menu image M needs to be spaced from the first occupant at a predetermined distance. Thereafter, as illustrated in FIG. 2B, the first occupant makes a specific gesture to move the holographic menu image M by a distance so that the first occupant may select the menu. In FIG. 2A, a holographic beam is displayed on the first occupant's hand to display the movement route of the holographic menu image M. Thereafter, as illustrated in FIG. 2C, the first occupant selects the button related to the driving control authority. Thereafter, as illustrated in FIG. 2D, the first occupant makes a request by touching the button (the left button in FIG. 2D) for requesting the transfer of the driving control authority. Of course, the first occupant may select a cancel button (right button in FIG. 2D) to maintain the previous state.

Referring back to FIG. 1, whether the first occupant has a vehicle driving control ability is determined (S20). In the instant case, the vehicle driving control ability is determined by collectively considering the age of the first occupant, whether the first occupant had a drink, whether the first occupant has a driver's license, and the like, and the vehicle driving control ability may mean whether the first occupant cannot control the vehicle driving. Whether the first occupant has the vehicle driving control ability may be determined using a camera mounted in the vehicle or various types of sensors for detecting information related to the occupant's state. If the first occupant does not have the vehicle driving control ability, the previous mode (the autonomous driving mode or the manual driving mode) of the vehicle driving is maintained even though the first occupant has requested the transfer of the driving control authority.

Referring back to FIG. 1, whether there is the second occupant who currently has the driving control authority is determined (S30). When there is the second occupant currently having the driving control authority, the second occupant is notified that the first occupant has requested the transfer of the driving control authority (S32). When the second occupant selects a button related to the driving control authority in the main menu image M, the screen is switched to a screen on which the second occupant may select whether to accept the request for the transfer of the driving control authority. The second occupant may accept the request of the first occupant by selecting a button for accepting the request for the transfer of the driving control authority (S40). Meanwhile, the notification may be configured in various forms such as sound or a graphic image which may be recognized by the second occupant.

FIG. 3A, FIG. 3B, FIG. 3C, and FIG. 3D are views exemplarily illustrating a process of manipulating an image to accept the transfer of the driving control authority in the holographic image according to the exemplary embodiment of the present invention.

Referring to FIG. 3A, FIG. 3B, FIG. 3C, and FIG. 3D, a holographic menu image identical to that illustrated in FIG. 2A, FIG. 2B, FIG. 2C, and FIG. 2D is displayed to the second occupant. In the instant case, the manipulation of the holographic menu image and the buttons is as described in FIG. 2A, FIG. 2B, FIG. 2C, and FIG. 2D. That is, when the notification of the request for the transfer of the driving control authority is displayed in the holographic menu image, the second occupant moves the holographic menu image to a position close to the second occupant, selects the button related to the driving control authority, and then accepts the request of the first occupant by selecting the button (right button in FIG. 3D) for accepting the transfer of the driving control authority. Of course, the second occupant may select a button (left button in FIG. 3D) for rejecting the transfer of the driving control authority.

Referring back to FIG. 1, when the second occupant accepts the request, the first occupant receives the driving control authority from the second occupant. Thereafter, the first occupant determines whether to select the autonomous driving mode or the manual driving mode (S50). That is, when the first occupant selects a button related to the driving mode in the main menu image M, the screen is switched to a screen on which the autonomous driving mode or the manual driving mode may be selected, and the first occupant may select any one of the modes. If the first occupant does not perform the mode selection, the previous mode is maintained.

When the first occupant selects the manual driving mode (S60), whether the manual driving is enabled is determined (S70). It is determined whether the first occupant has the qualifications necessary for the general manual driving. Like the determination on the driving control ability, whether the first occupant may perform the manual driving is determined by collectively considering the age of the first occupant, whether the first occupant had a drink, whether the first occupant has a driver's license, and the like. In the instant case, information, which cannot be recognized by a sensor in the vehicle, may be determined by receiving information from a connected external system. Meanwhile, if the first occupant cannot perform the manual driving, the previous mode is maintained.

When the first occupant selects the manual driving mode, various types of components required for the manual driving are displayed as the holographic images (S72).

Figure 4:
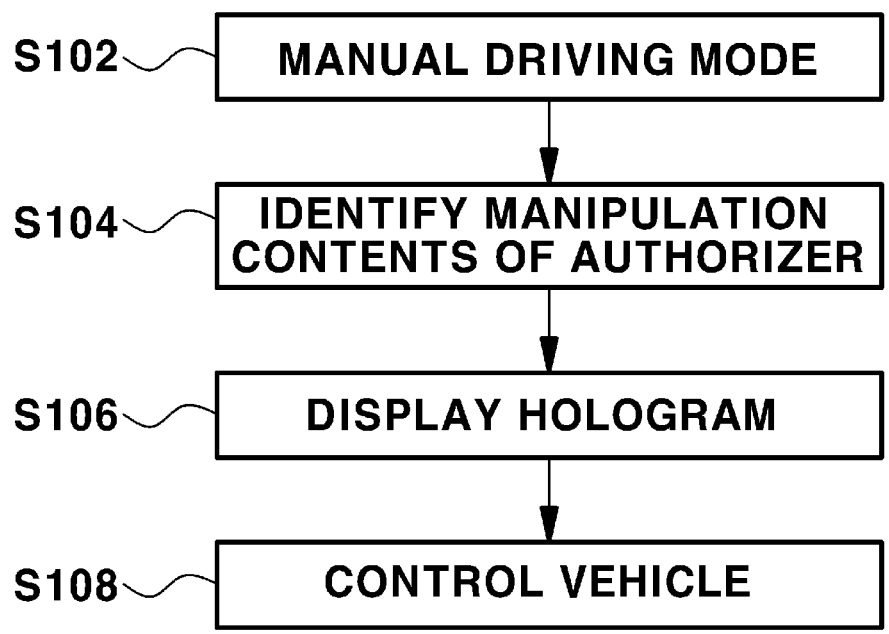
FIG. 4 is a flowchart illustrating a process of performing vehicle control using a holographic image in a manual driving mode according to the exemplary embodiment of the present invention.
Figure 5:
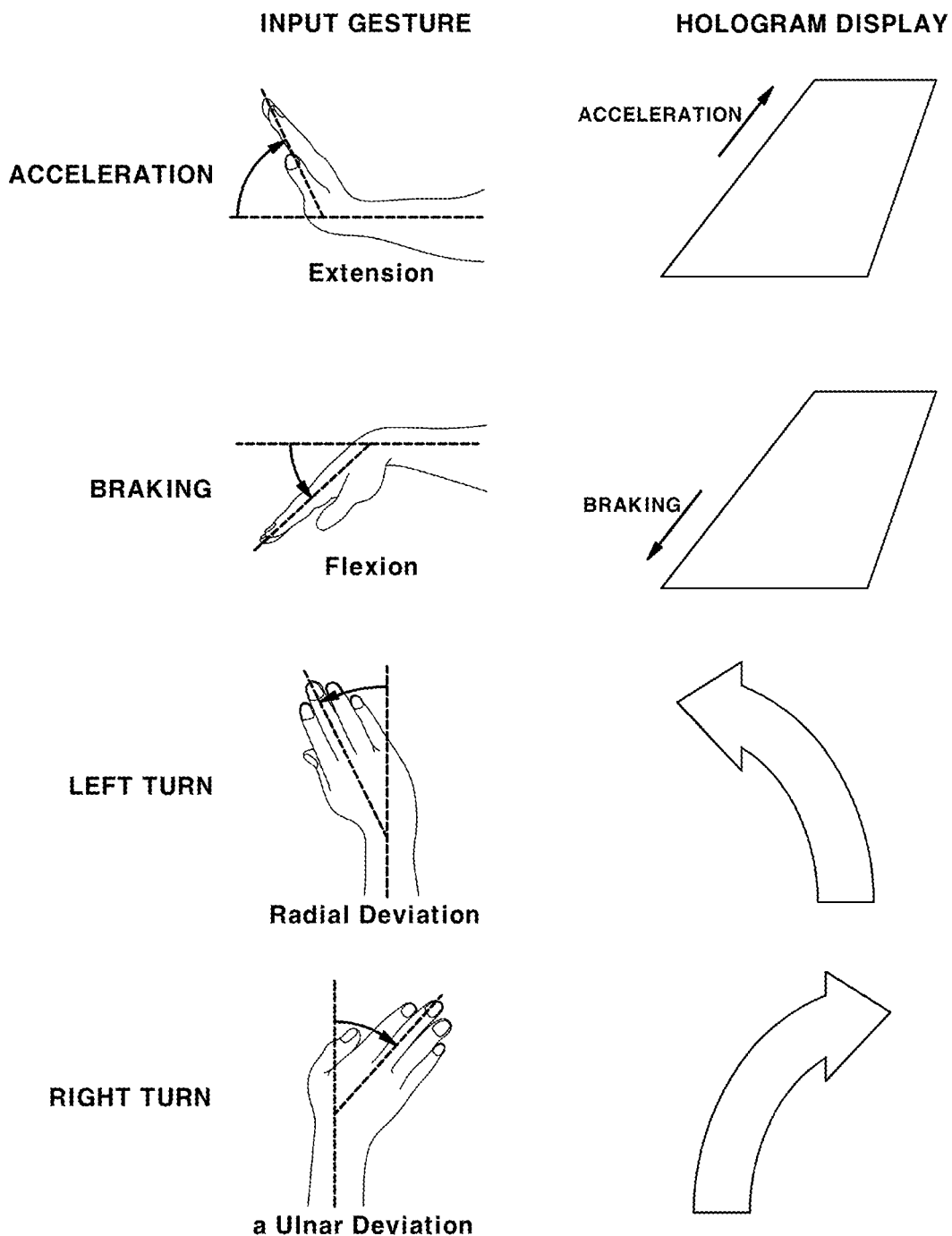
FIG. 5 is a view exemplarily illustrating holographic images that vary depending on gestures of an occupant in the manual driving mode according to the exemplary embodiment of the present invention.

FIG. 4 is a flowchart illustrating a process of performing vehicle control using the holographic image in the manual driving mode according to the exemplary embodiment of the present invention, and FIG. 5 is a view exemplarily illustrating the holographic images that vary depending on the occupant's gestures in the manual driving mode according to the exemplary embodiment of the present invention.

Referring to FIG. 4, when the first occupant selects the manual driving mode (S102), the manipulation contents of the authorizer (first occupant) are identified first (S104). The hologram device identifies the first occupant's gesture required for the vehicle driving control. Thereafter, the holographic image for the vehicle driving control corresponding to the specific gesture of the first occupant is displayed (S106), and the vehicle driving control is performed in accordance with the gesture of the first occupant (S108).

FIG. 5 illustrates acceleration, braking, left turn, and right turn required for the vehicle driving control according to the exemplary embodiment of the present invention. When the first occupant utilizes his or her hand to make a gesture in a specific pattern which is an input signal, the holographic image is changed as the position of the gesture is recognized. For example, when the first occupant makes a gesture related to acceleration or braking, a hologram in which colors are changed in a specific direction is displayed. When the first occupant makes a gesture related to left turn or right turn, a hologram in which arrows are changed in a specific direction is displayed. FIG. 5 illustrates only one aspect of gestures, and the gestures and the display of the holograms required for the vehicle driving control may be variously set.

Referring back to FIG. 1, when the first occupant selects the autonomous driving mode, the components required for the vehicle driving control are displayed as the holographic images (S62). In the autonomous driving mode, the components required for the vehicle driving control mean steering, braking, and the like in an emergency situation, and the description will be made in the exemplary embodiment focusing on braking of the autonomous vehicle.

Figure 6A:
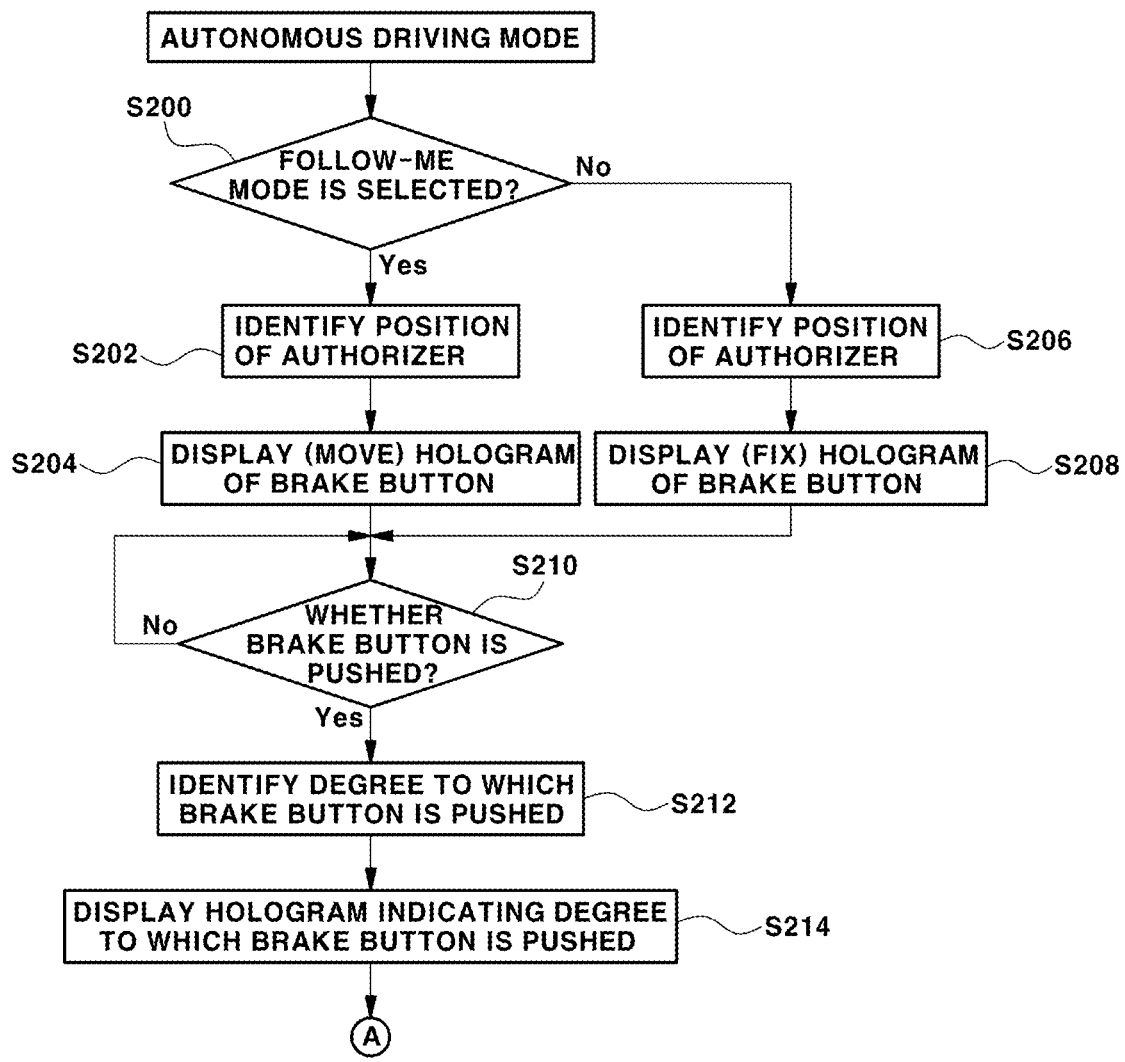
FIG. 6A and FIG. 6B are flowcharts illustrating processes of performing vehicle control using holographic images in an autonomous driving mode according to the exemplary embodiment of the present invention.
Figure 6B:
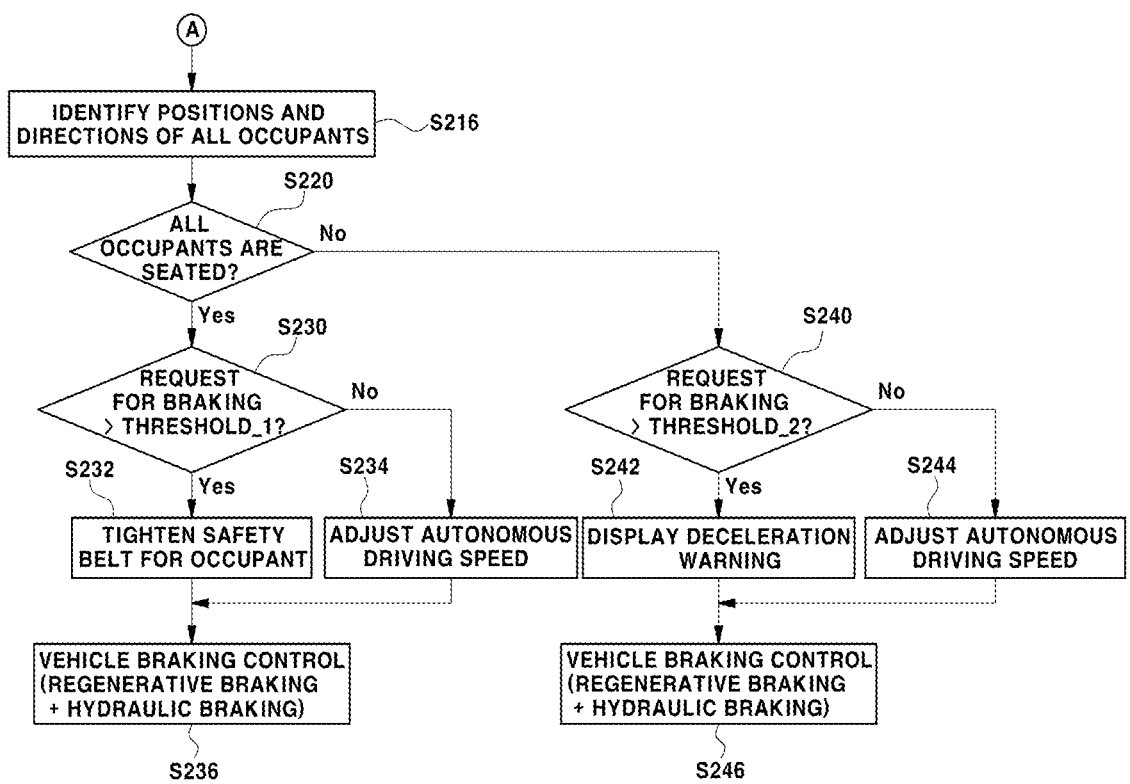
Figure 7A:
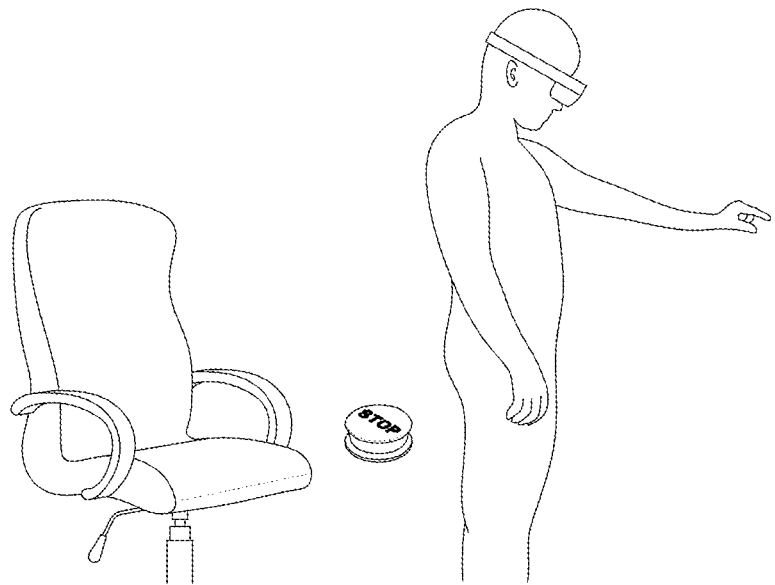
FIG. 7A is a view exemplarily illustrating a holographic braking image in a stationary mode.
Figure 7B:
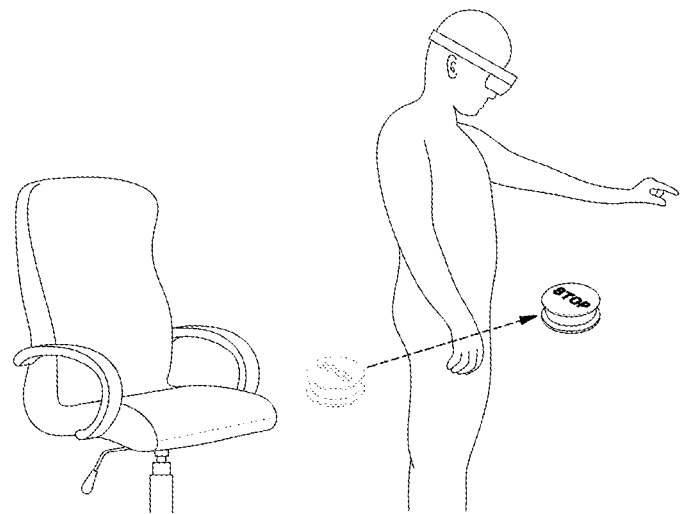
FIG. 7B is a view exemplarily illustrating a holographic braking image in a follow-me mode.

FIG. 6A and FIG. 6B are flowcharts illustrating processes of performing the vehicle control using the holographic image in the autonomous driving mode according to the exemplary embodiment of the present invention, FIG. 7A is a view exemplarily illustrating a holographic braking image in a stationary mode, and FIG. 7B is a view exemplarily illustrating a holographic braking image in a follow-me mode.

Referring to FIG. 6A and FIG. 6B, in the autonomous driving mode, the stationary mode and the follow-me mode may be implemented as holograms in a form of a button. As illustrated in FIG. 7A, the stationary mode is a mode in which the brake button is fixed at a specific position thereof. As illustrated in FIG. 7B, the follow-me mode is a mode in which the brake button follows the first occupant.

It is determined whether the first occupant selects the stationary mode or the follow-me mode (S200). When the first occupant selects the follow-me mode, the position of the first occupant is identified (S202) such that the brake button is displayed at a specific position and moves in accordance with the gesture of the first occupant (S204). On the other hand, when the first occupant touches the stationary mode, the position of the first occupant is identified (S206) such that the brake button is displayed at a specific position and fixed (S208).

Thereafter, it is determined whether the first occupant has selected the brake button (S210). When the brake button is selected, an amount to which the brake button is pushed is identified (S212), and a holographic image indicating the amount to which the brake button is pushed is displayed (S214). For example, a holographic image in which colors are changed in accordance with the amount to which the brake button is pushed may be displayed.

Thereafter, positions and directions at/in which all the occupants are in the vehicle are identified by use of a camera or the like (S216), and it is determined whether all the occupants are seated (S220).

In the state in which all the occupants are seated, the amount to which the brake button is pushed by the first occupant (request for braking) is compared with predetermined Threshold_1 (S230). When the first occupant's request for braking is greater than Threshold_1, the autonomous driving control unit allows a safety belt for the occupant to be tightened for safety (S232). When the first occupant's request for braking is smaller than Threshold_1, the autonomous driving control unit adjusts a vehicle speed in accordance with the request for braking (S234). In the instant case, the vehicle braking control performs both regenerative braking and hydraulic braking to improve fuel economy (S236).

On the other hand, in the state in which all the occupants are not seated, the amount to which the brake button is pushed by the first occupant (request for braking) is compared with predetermined Threshold_2 (S240). In the instant case, Threshold_2 may be set as a value smaller than Threshold_1. When the first occupant's request for braking is greater than Threshold_2, the autonomous driving control unit warns the occupants who are not seated (S242). When the first occupant's request for braking is smaller than Threshold_2, the autonomous driving control unit adjusts a vehicle speed in accordance with the request for braking (S244). In the instant case, the vehicle braking control performs both the regenerative braking and the hydraulic braking to improve fuel economy (S246).

Meanwhile, when comparing the case in which the vehicle driving control is performed using the holographic image with the case in which the vehicle driving control is performed by recognizing the occupant's voice, the vehicle driving control using the holographic image advantageously has a shorter reaction time than the vehicle driving control using the voice recognition.

In an exemplary embodiment of the present invention, a controller is installed to perform the methods shown in FIGS. 1 to 7B.

In addition, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In an exemplary embodiment of the present invention, each operation described above may be performed by a control device, and the control device may be configured by multiple control devices, or an integrated single control device.

In an exemplary embodiment of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of directly controlling an autonomous vehicle, the method comprising steps of:
   determining, by an autonomous vehicle control unit, whether there is a request of a first occupant currently having no driving control authority for the autonomous vehicle, for a transfer of the driving control authority by selecting a holographic image for requesting the transfer of the driving control authority;
   determining, by the autonomous vehicle control unit, whether there is acceptance of a second occupant currently having the driving control authority, for the request of the first occupant by selecting a holographic image for accepting the transfer of the driving control authority when the second occupant receives the request for the transfer of the driving control authority from the first occupant;
   determining, by the autonomous vehicle control unit, a vehicle control mode including a manual driving mode or an autonomous driving mode, in accordance with the first occupant's selecting the holographic image displaying the manual driving mode or the autonomous driving mode according to the acceptance by the second occupant;

performing, by the autonomous vehicle control unit, in accordance with the vehicle control mode selected by the first occupant, driving control of the autonomous vehicle by displaying a holographic image required for the driving control of the autonomous vehicle, changing the holographic image in a predetermined pattern in accordance with a gesture of the first occupant, and performing, by the autonomous vehicle control unit, the driving control in accordance with the gesture of the first occupant;

wherein the holographic images in the respective steps are implemented by a hologram device connected to the autonomous vehicle control unit required for the driving control, and the holographic images are displayed to the first and second occupants.

2. The method of claim 1, further including:
verifying, by the autonomous vehicle control unit, whether the first occupant has a driving control ability, when the transfer of the driving control authority is requested by the first occupant.

3. The method of claim 1, wherein the holographic image for requesting the transfer of the driving control authority and the holographic image for accepting the transfer of the driving control authorityare movable from an initial position spaced apart, with a predetermined distance, from an occupant authorized to select the holographic image to a final position which is a position at which the authorized occupant is able to select the holographic image.

4. The method of claim 1, further including:
determining, by the autonomous vehicle control unit, whether the first occupant is able to perform manual driving of the autonomous vehicle when the first occupant selects the manual driving mode.

5. The method of claim 1, further including:
maintaining, by the autonomous vehicle control unit, a previous vehicle control mode when the first occupant does not select the vehicle control mode.

6. The method of claim 1, wherein the holographic image required for the driving control includes at least one of holographic images related to steering, acceleration, and braking of the autonomous vehicle.

7. The method of claim 1, further including:
determining, by the autonomous vehicle control unit, whether in the autonomous driving mode, a follow-me mode in which the holographic image required for the driving control follows a position of the first occupant or a stationary mode in which the holographic image is fixed at a predetermined position in the autonomous vehicle, is selected.

8. The method of claim 7, further including:
identifying, by the autonomous vehicle control unit, a position of the first occupant in the follow-me mode, and
moving, by the autonomous vehicle control unit, an image of a brake button in accordance with the gesture of the first occupant, wherein the holographic image required for the driving control includes the image of the brake button.

9. The method of claim 7, further including:
identifying, by the autonomous vehicle control unit, a position of the first occupant in the stationary mode; and
fixing, by the autonomous vehicle control unit, an image of a brake button at a predetermined position,
wherein the holographic image required for the driving control includes the image of the brake button.

10. The method of claim 7, further including:
determining, by the autonomous vehicle control unit, whether the first occupant has selected an image of a brake button; and
displaying, by the autonomous vehicle control unit, an amount to which the brake button is pushed in a holographic image indicating the amount to which the brake button is pushed, when the brake button is selected,
wherein the holographic image required for the driving control includes the image of the brake button.

11. The method of claim 1, further including:
performing, by the autonomous vehicle control unit in the autonomous driving mode, braking control or adjustment of vehicle speed in accordance with a magnitude of a request for braking of the autonomous vehicle.

12. The method of claim 11, further including:
tightening, by the autonomous vehicle control unit in the autonomous driving mode, a safety belt for the first occupant when all occupants are seated in the autonomous vehicle and the request for braking is greater than a first threshold.

13. The method of claim 12,
wherein when the request for braking is smaller than a second threshold, the autonomous driving control unit adjusts the vehicle speed in accordance with the request for braking, and wherein the second threshold is smaller than the first threshold.

14. The method of claim 11, further including:
outputting, by the autonomous vehicle control unit in the autonomous driving mode, a warning signal when a predetermined number of all occupants are not seated in the autonomous vehicle and the request for braking is greater than a second threshold.

15. The method of claim 14, wherein when the request for braking is smaller than the second threshold, the autonomous driving control unit adjusts the vehicle speed in accordance with the request for braking.

16. The method of claim 11, further including:
outputting, by the autonomous vehicle control unit in the autonomous driving mode, a warning signal when a predetermined number of all occupants are not seated in the autonomous vehicle and the request for braking is greater than a second threshold.

17. The method of claim 1, wherein the autonomous vehicle control unit includes:
a processor; and
a non-transitory storage medium on which a program for performing the method of claim 1 is recorded and executed by the processor.

18. A non-transitory computer readable storage medium storing a program for performing the method of claim 1 and executed by a processor.

* * * * *